UNITED STATES PATENT OFFICE.

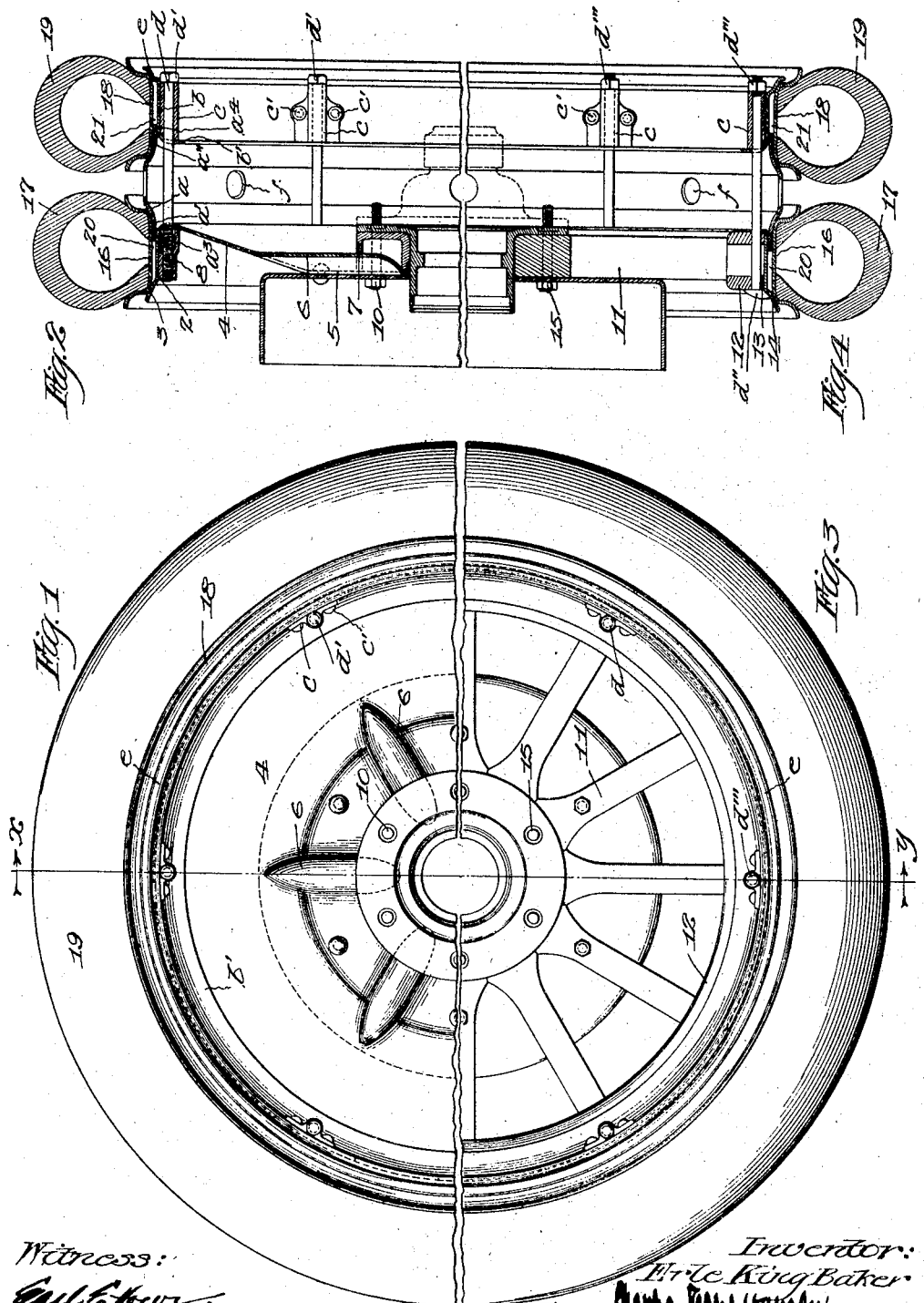

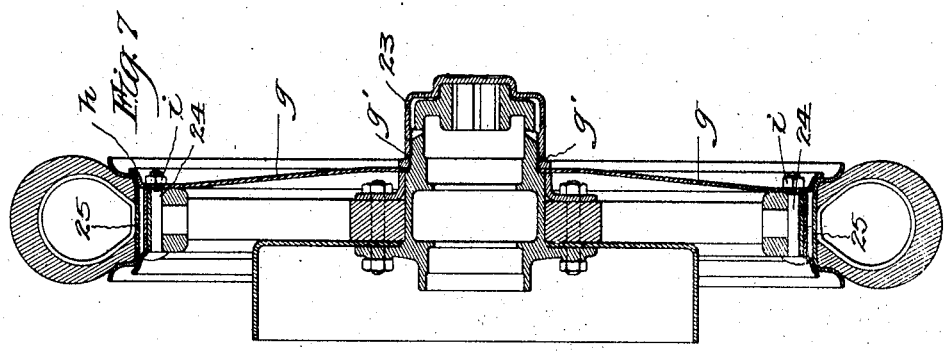
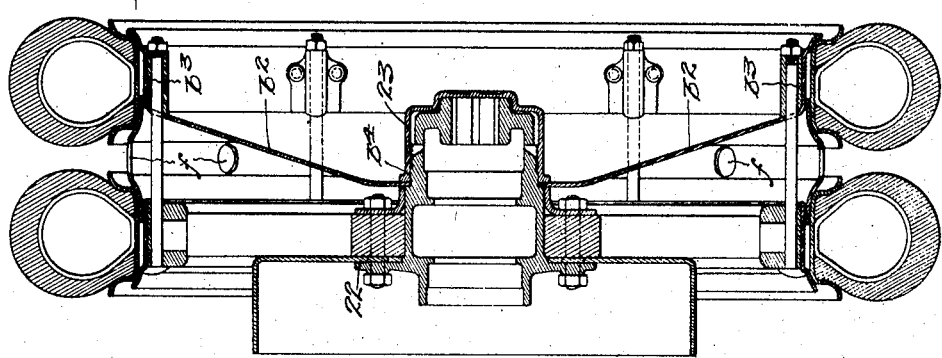
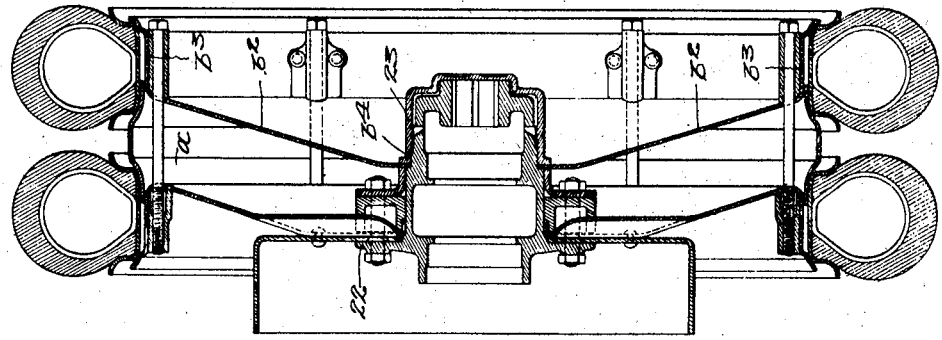

ERLE KING BAKER, OF CHICAGO, ILLINOIS, ASSIGNOR TO BAKER WHEEL & RIM COMPANY, OF CHICAGO, ILLINOIS, A CORPORATION OF ILLINOIS.

DUAL-TIRED WHEEL.

1,327,607.      Specification of Letters Patent.      Patented Jan. 13, 1920.

Application filed Feburary 11, 1918. Serial No. 216,442.

*To all whom it may concern:*

Be it known that I, ERLE K. BAKER, a citizen of the United States, and a resident of Chicago, county of Cook, and State of Illinois, have invented certain new and useful Improvements in and for Dual-Tired Wheels, of which the following is a specification.

My invention relates to improvements in automobile and motor truck wheels of the kind which are provided with dual tires; and more particularly, the invention-relates to means for demountably securing tires upon such wheels.

The primary object of my invention is to provide a dual tire wheel of minimum cost and weight, and which shall be extremely efficient, and both durable and reliable.

A further object of the invention is to provide means whereby a wheel may be used alternately as a single-tired wheel and as a dual tired wheel. In other words, my purpose is to provide a dual tire attachment that shall be demountably applicable to any standard single tired motor vehicle wheel of the demountable rim type.

Other objects of the invention and of certain modifications thereof are set forth hereinafter.

My invention will be readily understood on reference to the accompanying drawings, which form part of this specification, and in which I have depicted typical preferred embodiments of the invention.

In said drawings, Figure 1 illustrates the upper half of a pressed-steel wheel provided with dual tires in accordance with my invention;— Fig. 2, is a vertical section on the line *x*— of Fig. 1;— Fig. 3, is the counterpart of Fig. 1 but shows my attachment upon a wood wheel of standard construction;— Fig. 4 is a vertical section on the line *y*— of Fig. 3;— Fig. 5 is a vertical section of a modified form of my invention wherein the dual elements or members include a supplementary wheel protecting and bracing disk or web;— Fig. 6 is identical with Fig. 5, except that the attachment is shown upon a standard wooden wheel;— and, Fig. 7 illustrates a modified clamping and protecting disk which is applicable to an ordinary single tired wheel, yielding many of the advantages of a metal disk wheel and which is also applicable to the dual tire arrangement.

In Figs. 1 and 2, I have depicted the invention as applied to a pressed steel wheel. Such a steel wheel is pressed from a single sheet of metal and comprises a peripheral flange, 2, with a rim seative back flange, 3;— a conical felly portion 4;— and a wheel center portion, 5; and, the parts, 4 and 5, are characterized by spoke-like undulations, 6. At the center is a dental clutch hub ring, 7; and at the periphery a plurality of internally threaded lugs or nuts, 8, having wings that are riveted to the inner side of the flange 2. This wheel with its clutch ring, 7, is secured to the wheel hub, 9, by means of bolts, 10.

Fig. 3 illustrates a wood wheel of standard construction; the same comprising the spokes, 11; the felly, 12, and the felly-band, 13, the latter having the usual back-flange, 14. Such a wheel is also secured to the wheel hub by bolts, 15, substantially identical with the bolts, 10.

It will be noted that the peripheral flanges or felly-band, 13, of the wooden wheel finds its counterpart in the peripheral flange, 2, of the metal wheel; in other words, both wheels receive the tire-carrying rims in the same manner and in the same relations to their peripheral bands and back flanges.

Except for the described differences of wheel structure, Figs. 1 and 3 may, with convenience, be read as a single figure of the drawings. Similarly Figs. 2 and 4, may be read as one figure. Treating them in this manner, the further parts may be identified as though associated with a single primary wheel. Thus 16 represents an ordinary integrally flanged straight-side rim of the transplit or Baker type. The present invention is not limited to such rims, for obviously, rims of other types may be substituted upon the wheel. In this connection it will be understood that (while not shown) there is in each case a driving connection between the demountable rim, 16, and the periphery of the wheel. There is also in each case a suitable valve-stem arrangement. The rim, 16, carries a pneumatic tire, 17. It will be understood that when the wheel proper or primary wheel, is used with a single rim, 16, and tire, 17, the rim is secured to the wheel by means of ordinary clamping lugs and short bolts (not shown); it suffices that the clamping bolts of such devices are at such times, held in the lugs, 8; or in the case of the wooden felly, 12, are held in the felly in usual manner.

It will now be understood that this present invention does not modify the primary wheel or its demountable rim construction, in any such ordinary manner as would prevent the ordinary use of the wheel with a single rim and tire.

To convert the primary wheel into a dual wheel, I apply, in addition to another rim and tire, only two main parts, to-wit, a rim separating and bridging ring, $a$, and a duplicate felly-band or ring, $b$. The parts which require additional mention are the smooth bored lugs, $c$, on the ring, $b$, and the long clamping bolts $d$, which last extend therethrough and into the fastenings provided therefor on the felly band portion of the primary wheel.

If desired there may be a positive driving notch or other connection between the ring and the parts which it engages. Ordinarily the friction between the parts is sufficient for the purpose. 18, represents the second rim and, 19 the second tire. The rims 16 and 18 should be interchangeable and therefore are preferably identical. In both cases there is an annular space, 20, 21, between the rim and the substantially cylindrical band or flange which carries it. In the case of the primary wheel, the back flange is on the inner side of the wheel. In the case of the member, $b$, the corresponding part or front flange, $e$, receives the outer rim. The separator ring, $a$, is itself flanged at both edges to provide conical or flaring surfaces, $a'$ and $a''$, as seats for respective rims, 16 and 18. The flanges of the ring, $a$, correspond in function to the flanges, 3, 14 and $e$. The extreme edges, $a^3$ and $a^4$, enter the annular spaces, 20 and 21, respectively and bear firmly upon the outer faces of the peripheral flanges, 2—13 and $b$. I prefer that the extreme edges of the ring, $a$, shall be somewhat thinner than the body of the ring, and they may be turned outwardly or rounded, to insure easy entrance into the annular spaces 20, 21.

In many cases a cylindrical member, $b$, strengthened by means of an outwardly turned flange, $e$, will be found to have sufficient strength; but in most cases I prefer to reinforce the member, $b$, by forming its inner edge as an inwardly turned flange, $b'$. This flange is perforated, i. e. has bolt holes corresponding to the bores of the parts, $c$. It will also be noted that the lugs, $c$, bear against this flange $b'$, which therefore aids the rivets, $c'$, against the displacing pressure of the bolts, $d$.

In the case of a primary wheel, which is provided with internally threaded lugs or fixed nuts 8, I use bolts which are threaded at their inner ends and have heads, $d'$, at their outer ends. The heads of the bolts are accessible on the outer side of the wheel. The bolts pass through the parts, $c$, and through holes in the reinforcing flange, $b'$, and thence into the threaded blocks or lugs, 8. Where necessary the heads, $d''$, of the long clamping bolts may be placed on the inner side of the wheel and against the flange, 14, as shown in Figs. 2 and 4, after the manner of the short bolts in common use. In such cases the threaded ends of the bolts are presented on the outer side of the dual wheel and the parts are secured by tightening nuts, $d'''$, thereon. The smooth bores of the lugs, $c$, permit the use of the member, $b$, interchangeably with long bolts of the two kinds shown.

By assembling the parts, $a$, $b$ and 18 in positions shown with respect to the primary wheel and the rim, 16, and by then tightening the bolts, $d$, I convert the primary wheel into a dual tired wheel. By removing these parts, I reconvert the structure into a single tired wheel. The dual structure has distinct advantage in that the rim separating ring, $a$, causes the two rims, 16, 18, to accept a parallel relation when the parts are bolted together; but more important still is the function which the ring, $a$, performs as an extended felly flange or bridge member which serves to extend or widen the periphery of the primary wheel and provide a proper foundation for the second rim, 18. Obviously, the inner edge of the ring, $a$, is firmly seated upon the periphery of the primary wheel, while the outer edge of the member, $a$, because it snugly fits the member, $b$, serves to rigidly support that member in concentric relation to the primary wheel. It should particularly be noted that the rims, 16 and 18, are themselves further spacing members which, (because they prevent the collapsing together of the wheel, the ring $a$, and the ring $b$,) determine the overall width of the dual wheel; and this without recourse to the use of a permanent wide felly band or flange upon the primary wheel. The construction last described is the common construction, and is objected to because it permanently increases the weight of the primary wheel and necessitates the use of two rims at all times.

Preferably, the member, $a$, is an endless ring; that is, I prefer to form it from strip metal stock which, being first an open ring, is electrically welded to make it a solid ring and is then either stretched or compressed to the exact dimension essential to a good fit upon the primary wheel, and upon the member, $b$. However, I wish it understood that the member, $a$, may be a transversely split ring, and, indeed, the ring is very convenient when made in that form; inasmuch as such an open rim readily adjusts itself to differences of diameter and shape in the fixed rim (2.13) of the primary wheel and to like irregularities in the ring, $b$.

The accumulation of water and mud from the road, is prevented by means of holes, $f$, which I provide in the ring, $a$. These holes are of considerable size, and the rotation of the wheel serves to discharge therethrough all the mud, dirt, small stones, and the like, which would otherwise lodge upon the inner periphery of the assembled structure.

A desirable modification of the invention is shown in Fig. 5. This figure incidentally discloses a complete steel wheel, such as I have represented in my said companion application, together with a brake drum construction which is appropriate to a hub which has its flange, 22, at its inner end. The modification of present interest comprises a disk-like dished central web or deep flange on the outer rim carrying ring $b^2$. This may be regarded as an extension of the inner edge of the detachable "dual" ring, $b^3$, taking the place of the smaller flange, $b'$, before described. The web or cone, $b^2$, has a hub-hole, $b^4$, which fits the wheel hub. A tight fit at this point is not required and, as shown, I prefer that the hub-cap, 23, shall serve to secure the center portion of the disk $b^2$, with respect to the hub. Obviously the web, $b^2$, thus becomes a portion of the wheel structure or, more properly, a reinforcing member thereof and to that extent relieves the separator or bridge ring, $a$, from a portion of the stresses incident to the application and use of the second rim and tire. Where the web $b^2$, is employed upon an imperforate primary wheel, the holes, $f$, may be omitted from the separator ring, $a$; for the wheel and the disk, $b^2$ then inclose the ring $a$, and prevent the entrance of dirt.

Fig. 6, illustrates the application of the dual disk member, $b^2$, $b^3$, to a standard wood wheel. In this case the openings $f$, should be retained in the separator or spreader ring $a$, to prevent the accumulation therein of dirt which may be received between the spokes, from the inner side of the wheel.

Dual-tired wheels are ordinarily used only upon the driving axles of motor cars, and it is for this reason that I have shown the brake drums attached to the primary wheels. It will be clear, however, that brake drums are not essential to the particular invention herein described, and obviously, should not be used upon dual tired wheels which do not require brakes.

Customarily, a standard wooden wheel is used with a single tire, the demountable rim being secured by means of wedge lugs, or like clamping devices, held upon short bolts, 24, such as are shown in Fig. 7. Generally speaking the wooden wheel is objected to because of danger of breaking its spokes, particularly in war service, where the spokes are likely to be shattered or splintered by flying shot. Hence metal disk wheels are preferred for such service. To obviate this difficulty and as a means for reinforcing and protecting wooden wheels, and also metal wheels, when used with single tires, I complete my wheel accessory equipment by adding thereto a metal disk which serves as a covering for the body of the wheel, and at the same time takes the place of the many separate clamping lugs ordinarily used in the single tire and rim service. This device is illustrated in Fig. 7, from which it will appear that the added part, to-wit, the metal disk, $g$, is adapted for use upon both the wooden and the metal wheels. At its center the disk preferably has a hub hole, $g'$, made to fit the wheel hub whatever its kind or design or the disk may be a deeper cone and completely cover the wheel hub. At the periphery of the disk, $g$, I provide an outwardly turned flange, $h$, similar to the back flange on the wheel, and which engages the rim, 25, in like manner. The flange, $h$, and its wheel protecting web or disk proper $g$, are readily fastened to the wheel by nuts, $i$, on the short bolts, 24. The nuts, $i$, may be replaced by bolt heads, in cases where complementary threaded nuts are provided on the inner side of the wheel. Thus, when the dual attachment is removed, the disk, $g$, may take its place and serve the described purposes of reinforcing and protecting the wheel while serving as the very efficient clamping device for the single remaining rim and tire.

The disk $g$, has a distinct relation to the described dual wheel attachment. In case of the loss of one of the deeper members, $b$ or $b^3$, the member, $g$—$h$, may be substituted therefor, having bolt holes in the same positions and hence being adapted to receive the long "dual" bolts, $d$, whereby the flange $h$, of the disk, $g$, may be held against the rim 18.

Various modifications of my invention will readily suggest themselves to one who is skilled in the art and hence I do not limit or restrict my invention to the precise structures herein shown and described, except as comprehended and defined by the appended claims.

Having thus described my invention, I claim as new and desire to secure by Letters Patent:—

1. The herein described improvement comprising a dual wheel attachment composed of a rim separating and bridging ring, in combination with a complementary-rim carrying-ring partly telescoped upon the first mentioned ring, and means associated with said rim-carrying ring and adapted to rigidly secure the two rings together and to the fixed rim of a primary wheel.

2. The herein described improvement comprising a dual wheel attachment composed of a rim separating and bridging ring, in combination with a complementary-rim carrying-ring partly telescoped within the first mentioned ring, and having a deep central web or flange containing a central hole fitted to receive the hub of a primary wheel, and means associated with said rim-carrying ring and adapted to rigidly secure the two rings together and to the fixed rim of such primary wheel.

3. A wheel having a fixed rim, in combination with a demountable rim thereon and, at the front, separated from the fixed rim by an annular space, a rim-separating and bridging ring telescoped upon said fixed rim in said annular space, a second demountable rim borne by said ring, a clamping ring like unto the fixed rim on the wheel and acting adjacent said second rim, and clamping bolts secured to the fixed rim of the wheel, and fastening the two rims and the two rings in place.

4. A wheel having a fixed rim, in combination with a demountable rim thereon and, at the front, separated from the fixed rim by an annular space, bolt fastenings on said wheel, a rim-separating and bridging ring telescoped upon said fixed rim in said annular space, a second demountable rim telescoped on said ring, a clamping ring like unto the fixed rim on the wheel and acting against said second rim, and clamping bolts extending from said clamping ring to said fastenings on the wheel.

5. A wheel having a fixed rim, in combination with a demountable rim thereon and, at the front, separated from the fixed rim by an annular space, a rim-separating and bridging ring telescoped on said fixed rim in said annular space, a second demountable rim telescoped on the said ring, a complementary carrying ring like unto the fixed rim on the wheel and telescoped within the first-mentioned ring, and clamping bolts rigidly connecting said fixed rim and complementary ring.

In testimony whereof, I have hereunto set my hand this 25th day of January, 1918.

ERLE KING BAKER.